(12) United States Patent
Kim et al.

(10) Patent No.: US 8,373,642 B2
(45) Date of Patent: Feb. 12, 2013

(54) LIQUID CRYSTAL DISPLAY DEVICE AND DRIVING METHOD THEREOF

(75) Inventors: Jang Ho Kim, Gangnam-gu (KR); Hyun Ha Hwang, Gangnam-gu (KR)

(73) Assignee: LG Display Co., Ltd., Seoul (KR)

( * ) Notice: Subject to any disclaimer, the term of this patent is extended or adjusted under 35 U.S.C. 154(b) by 871 days.

(21) Appl. No.: 12/094,151

(22) PCT Filed: Nov. 13, 2006

(86) PCT No.: PCT/KR2006/004736
§ 371 (c)(1),
(2), (4) Date: May 17, 2008

(87) PCT Pub. No.: WO2007/058448
PCT Pub. Date: May 24, 2007

(65) Prior Publication Data
US 2008/0297465 A1  Dec. 4, 2008

(30) Foreign Application Priority Data
Nov. 18, 2005  (KR) .................. 10-2005-0110623

(51) Int. Cl.
*G09G 3/36* (2006.01)

(52) U.S. Cl. .............................. 345/102; 345/87; 345/88
(58) Field of Classification Search ............. 345/87–104
See application file for complete search history.

(56) References Cited

U.S. PATENT DOCUMENTS

| | | | |
|---|---|---|---|
| 2002/0057253 | A1 | 5/2002 | Lim et al. |
| 2002/0070914 | A1 | 6/2002 | Bruning et al. |
| 2005/0035939 | A1* | 2/2005 | Akiyama ...................... 345/102 |

FOREIGN PATENT DOCUMENTS

| | | |
|---|---|---|
| JP | 2003-177716 A | 6/2003 |
| KR | 10-2003-0053829 A | 7/2003 |
| KR | 10-2004-0042402 A | 5/2004 |
| KR | 10-2005-0067750 A | 7/2005 |

* cited by examiner

*Primary Examiner* — Amare Mengistu
*Assistant Examiner* — Tony N Ngo
(74) *Attorney, Agent, or Firm* — Birch, Stewart, Kolasch & Birch, LLP

(57) ABSTRACT

An embodiment of the present invention provides a method of driving a liquid crystal display device including a liquid crystal panel, and a backlight assembly providing light to the liquid crystal panel by a field sequential driving method, the method includes: displaying an image, at the liquid crystal panel and the backlight assembly, by time-dividing two frames into five sub-frames, wherein when images are displayed in the two frames, images of a first frame and a second frame of the two frames share one blue light.

17 Claims, 3 Drawing Sheets

LIQUID CRYSTAL DISPLAY DEVICE AND DRIVING METHOD THEREOF

CROSS-REFERENCE TO RELATED APPLICATION

This application is the U.S. national stage application of International Patent Application No. PCT/KR2006/004736, filed Nov. 13, 2006, the disclosure of which is hereby incorporated by reference in its entirety.

TECHNICAL FIELD

The present invention relates to a liquid crystal display device, and a driving method thereof.

BACKGROUND ART

A cathode ray tube (CRT) had been most widely used among various display devices displaying image information. However, the CRT caused many inconveniences in use due to its relatively great volume and a heavy weight compared to its display area.

Accordingly, thin flat display devices that have a slim profile and a large display area and thus can be easily used in any place have been developed and are gradually replacing CRTs. Particularly, liquid crystal display (LCD) devices have excellent display resolution compared to other flat display device and have fast response time that can be compared to that of CRTs when realizing a moving image.

FIG. 1 is a view illustrating a related art LCD device. Referring to FIG. 1, the related art LCD device includes a first substrate 10, a second substrate 20, and a liquid crystal layer 30 formed between the first substrate 10 and the second substrate 20. The LCD device includes a first polarizer 12 formed under the first substrate 10, and a second polarizer 22 formed on the second substrate 20.

An array device having thin film transistors (TFTs), and pixel electrodes 14 transmitting incident light are formed on the first substrate 10. Although not shown, the array device includes a plurality of gate lines, a plurality of data lines, pixel regions defined by the gate lines and the data lines, and the TFTs formed at intersections of the gate lines and the data lines.

A black matrix 26, a color filter 28, and a common electrode 24 are formed under the second substrate 20.

In the LCD device having such a structure, the TFT, a switching device, is disposed in each pixel. The TFT is switched when a scan signal is input through the gate line, and thus applies a signal inputted by the data line to the liquid crystal layer 30.

Since liquid crystals have molecular arrangement with directionality and polarity, the molecular arrangement is controlled when an electric field is artificially applied to liquid crystal molecules injected into a cell gap of a liquid crystal panel. Thus, an alignment direction of the liquid crystal molecules can be controlled by a signal applied to the liquid crystal layer 30. Since the control of the alignment direction of the liquid crystal layer 30 may allow transmitting or blocking of light, light passing through the liquid crystal layer 30 implements colors and images.

However, the LCD device is disadvantageous in that the color gamut is undesirably reduced by a transmittance characteristic of a color filter since color reproduction is made when white light having passed through the liquid crystal layer 30 passes through the color filter.

Also, since the liquid crystals are driven by an applied electric field, a response time of the liquid crystals is somewhat slow, which may cause afterimages when images change swiftly.

Therefore, a liquid crystal display device having a high response rate are needed to stably obtain a high quality, high resolution image. Also, a driving method of the LCD device, which is able to display a visually comfortable moving image, is also needed.

DISCLOSURE OF INVENTION

Technical Problem

An embodiment of the present invention provides an LCD device and a driving method thereof which is able to implement an image with high brightness, high resolution and high quality.

Technical Solution

An embodiment of the present invention provides a liquid crystal display device includes a liquid crystal panel; and a backlight assembly providing light to the liquid crystal panel repetitively in order of red light, green light, blue light, red light, and green light.

An embodiment of the present invention provides a method of driving a liquid crystal display device including a liquid crystal panel, and a backlight assembly providing light to the liquid crystal panel repetitively in order of red, green, blue, red and green light, the method including: displaying, at the liquid crystal panel and the backlight assembly, an image by time-dividing two frames into five sub-frames; and displaying an image on the liquid crystal panel using repetitive emission of red light, green light, blue light, red light and green light that are sequentially emitted from the backlight assembly for the respective sub-frames.

An embodiment of the present invention provides a method of driving a liquid crystal display device including a liquid crystal panel, and a backlight assembly providing light to the liquid crystal panel by a field sequential driving method, the method includes: displaying an image, at the liquid crystal panel and the backlight assembly, by time-dividing two frames into five sub-frames, wherein when images are displayed in the two frames, images of a first frame and a second frame of the two frames share one blue light.

Advantageous Effects

In an LCD device and a driving method according to an embodiment of the present invention, two frames are formed using five sub-frames respectively emitting red, green, blue, red and green light. Thus, the display time for each sub-frame is extended, and thus the incidence times of the red light and the green light are increased, so that a high resolution, high quality image with an improved brightness can be obtained.

In the LCD device and the driving method thereof according to an embodiment of the present invention, since light sources respectively emitting red light, green light and blue light are provided, a high quality color image can be obtained without using a color filter. Hence, light absorption caused by the color filter does not occur so that an image with a high brightness can be obtained.

In the LCD device and the driving method thereof according to an embodiment of the present invention, two frames are formed using five sub-frames emitting red, green, blue, red, green light. Thus, the display time for each sub-frame is extended, and thus the arrangement time of liquid crystals is increased, so that a technology for a high response speed of the liquid crystals is not necessary. Consequently, a manufacturing cost can be saved.

In the LCD device and the driving method according to an embodiment of the present invention, since a unit pixel is not divided into R, G and B sub-pixels, an aperture ratio can be improved, and a high resolution image can be obtained.

In the LCD device and the driving method according to an embodiment of the present invention, the LCD device is driven, not in units of the related art R, G and B sub-pixels, but in units of unit pixels corresponding to a combination of the related art R, G and B sub-pixels, thereby allowing one driving device per unit pixel. Consequently, a manufacturing cost can be saved.

MODE FOR THE INVENTION

It will also be understood that when a layer (film), a region, a pattern, or a structure is referred to as being 'on' or 'under' another layer (film), region, pattern or structure, it can be directly 'on' or 'under' the other layer or substrate, or intervening layers may also be present.

An embodiment of the present invention will now be described in detail with reference to accompanying drawings.

Figure 1:
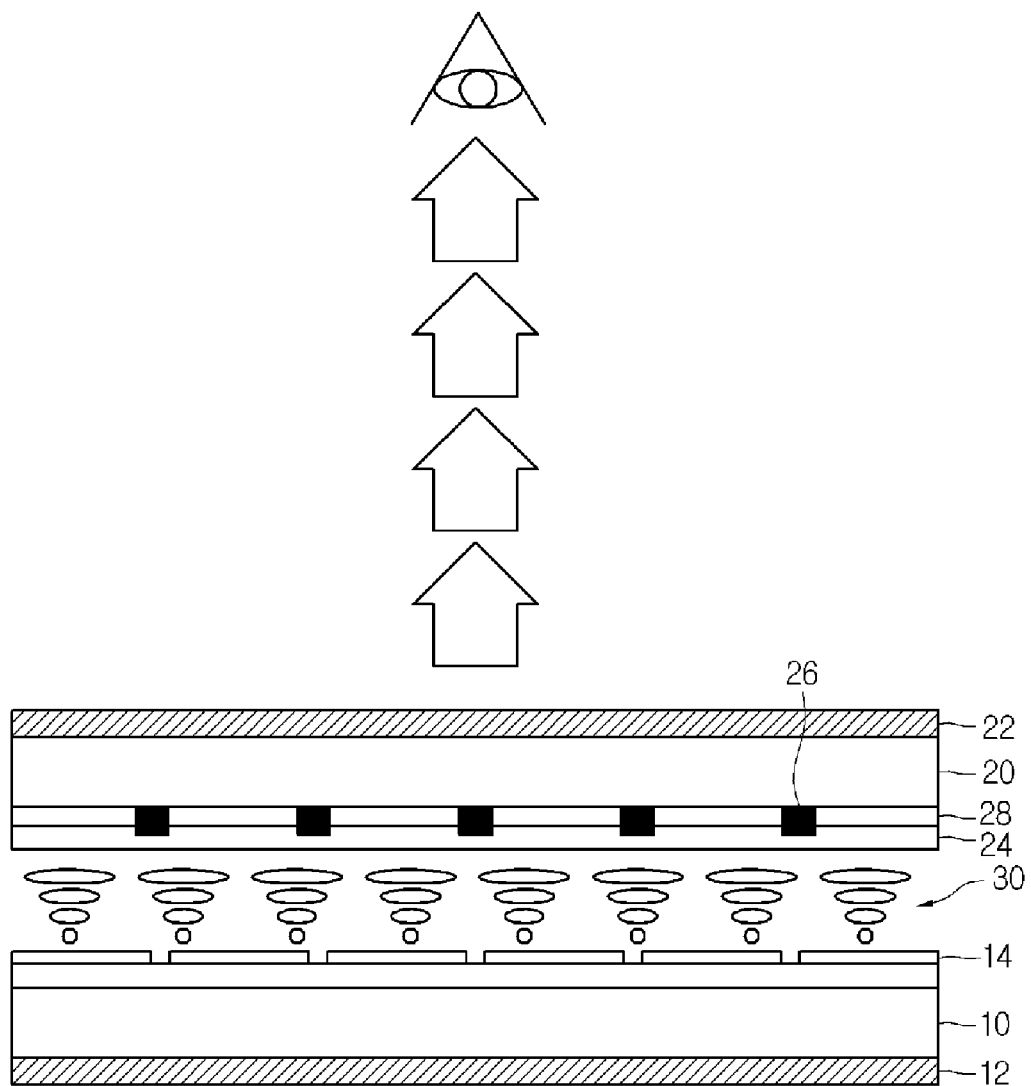
FIG. 1 is a conceptual view illustrating a related art LCD device.
Figure 2:
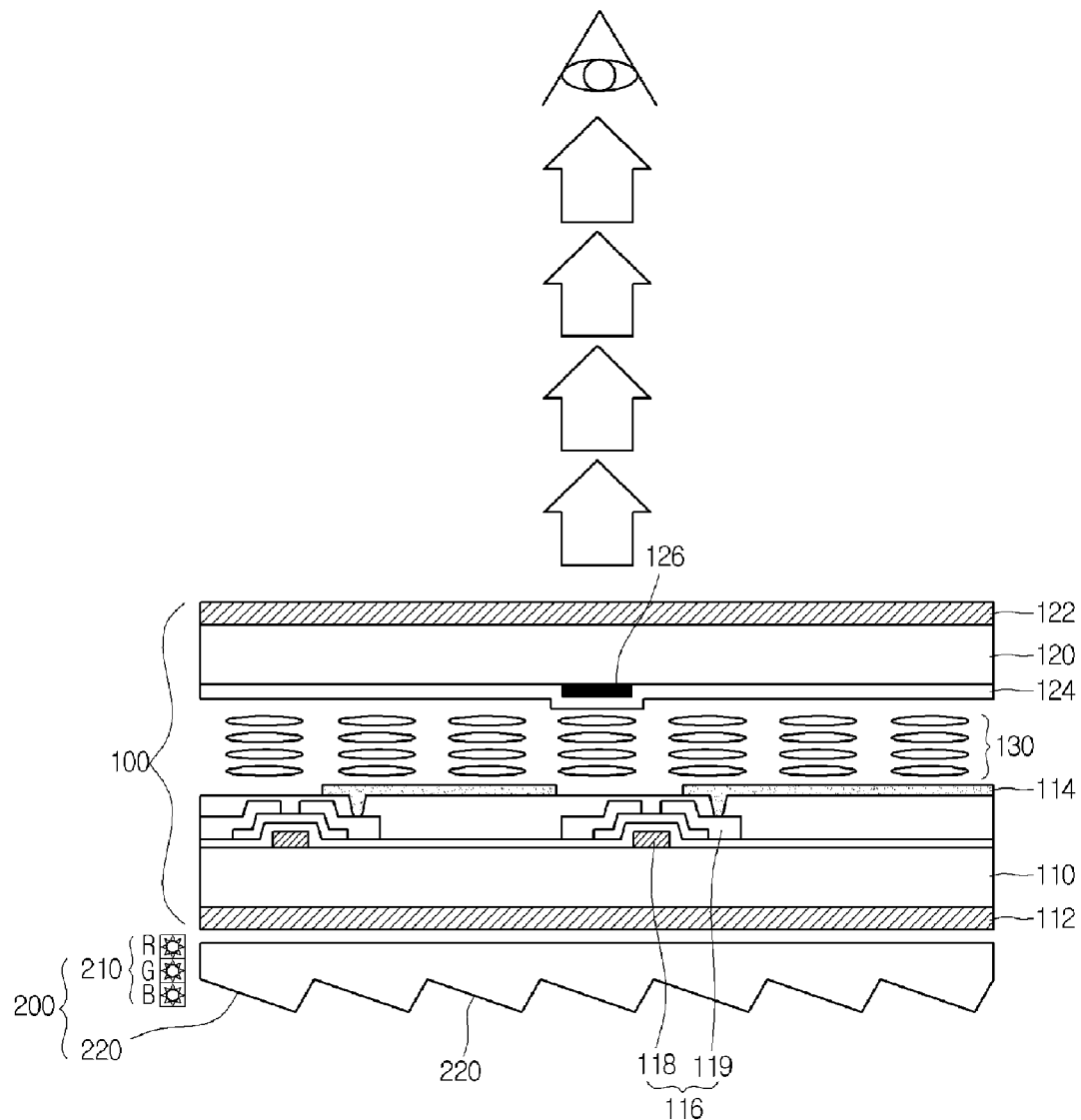
FIG. 2 is a conceptual view illustrating an LCD device according to an embodiment of the present invention.

FIG. 2 is a conceptual view illustrating an LCD device according to an embodiment of the present invention.

An LCD device according to an embodiment of the present invention includes a liquid crystal panel 100, and a backlight assembly 200 providing light for image display.

Since the LCD device according to an embodiment of the present invention employs a field sequential driving method, a color filter does not present in the liquid crystal panel 100. In a driving method of the LCD device according to an embodiment of the present invention, red light, green light, blue light, red light, and green light emitted are sequentially emitted from the backlight assembly 200 to the liquid crystal panel 100, so as to display a color image.

The liquid crystal panel 100 according to an embodiment of the present invention includes a first substrate 110, a second substrate 120, and a liquid crystal layer 130 formed between the first substrate 110 and the second substrate 120. The liquid crystal panel 100 includes a first polarizer 112 and a second polarizer 122.

An array device including thin film transistors (TFTs) 116, and pixel electrodes 114 transmitting incident light to display an image are formed on the first substrate 110. The array device includes a plurality of gate lines, a plurality of data lines, pixel regions defined by the gate lines and the data lines, and the TFTs 116 formed at intersections of the gate lines and the data lines.

The TFT 116 is disposed in each of the pixel regions of the first substrate 110, and serves to apply/block a signal voltage to the pixel electrode 114. The TFT 116 includes a gate electrode 118 to which a gate signal is applied, and a drain electrode 119 applying an input data signal to the pixel electrode 114.

A black matrix 126 and a common electrode 124 are formed under the second substrate 120. The black matrix 126 is formed in the location which is confronted between the pixel electrodes 114. The common electrode 124 may be formed, for example, by depositing indium tin oxide (ITO).

The common electrode 124 applies a voltage to the liquid crystal layer 130 together with the pixel electrodes 114 of the first substrate 110.

The liquid crystal layer 130 is formed between the first substrate 110 and the second substrate 120. A first polarizer 112 is provided under the first substrate 110 to control polarization of incident light. A second polarizer 122 is provided on the second substrate 120 to control polarization of incident light.

The first polarizer 112 and the second polarizer 122 may be formed to make a vibration direction of linearly-polarized light parallel to alignment directions of alignment layers formed on the first and second substrates 110 and 120, respectively.

The backlight assembly 200 includes a light emitting unit 210 that sequentially emits red light (R), green light (G), blue light (B), red light (R), and green light (G), and a light guide plate 220 that provides light emitted from the light emitting unit 210 to the liquid crystal panel 100.

The light emitting unit 210 may include a red light emitting diode (LED), a green LED, a blue LED, a red LED, and a green LED so as to repetitively emit light in order of [red light, green light, blue light, red light, and green light].

The light emitting unit 210 may include a red LED, a green LED, and a blue LED so as to repetitively emit light in order of [red light, green light, blue light, red light, and green light]. In the case where the light emitting unit 210 include the red LED, the green LED and the blue LED, the driving of the light emitting unit 210 is controlled such that the LEDs can sequentially emit light during respective time intervals resulted from time-division of two frames into five sub-frames.

When the backlight assembly 200 is a direct type in which the light emitting unit 210 is placed under the liquid crystal panel 100, the light guide plate 220 may not be provided.

The backlight assembly 200 according to an embodiment of the present invention sequentially emits red light, green light, blue light, red light and green light by a field sequential driving method. Since the backlight assembly 200 can implement colors for itself, there is no need to form a color filter in the liquid crystal panel 100. Hence, according to an embodiment of the present invention, light transmittance reduction caused by the color filter is solved, thereby improving the brightness.

A driving method of the light emitting unit 210 according to an embodiment of the present invention employs a field sequential driving method. As for the field sequential driving method, in order to implement colors, color LEDs are sequentially operated to emit red light (R), green light (G), blue light (B), red light (R) and green light (G) to the liquid crystal panel 100 via the light guide plate 220 at time intervals.

In the field sequential driving method according to an embodiment of the present invention, two frames are time-divided into five sub-frames, and red light, green light, blue light, red light and green light are sequentially emitted for the respective sub-frames to make an additive mixture of colors, thereby reproducing colors.

Here, the frame refers to a unit of displaying an image to the liquid crystal panel. In the related art, one frame is time-divided into three sub-frames, and red light (R), green light (G) and blue light (B) are sequentially emitted for the respective sub-frames, thereby forming an image.

In contrast, in the driving method of the LCD device according to an embodiment of the present invention, two frames are time-divided into five sub-frames. Then, red light (R), green light (G), blue light (B), red light (R) and green light (G) are sequentially driven for the respective sub-frames so as to display an image. Accordingly, in the driving method of the LCD device according to an embodiment of the present invention, images of the first frame and the second frame share blue light.

This method takes advantages of features of the human eye which is very sensitive to the sharpness of a black-and-white image but insensitive to the sharpness of a color image. That is, an embodiment of the present invention uses ambiguity of the human eye so as to efficiently reconstruct a color.

Specifically, the human eye is most sensitive to green, then to red, and least sensitive to blue.

For example, it is assumed that when white light is made up of a mix of the three primary colors, red, green and blue light, the brightness thereof is 100%. In this case, the sensitivity of the eye to brightness works on green, red and blue in the ratio of 59%:30%: 11%, respectively.

Thus, by using blue light, which the eye is least sensitive to, for both image implementation of the first frame and that of the second frame in common, an image with high brightness can be effectively obtained. That is, the frame time for which blue light is emitted is reduced, and the frame times for which red light and green light are emitted is extended, so that an image with higher brightness can be obtained.

Figure 3:
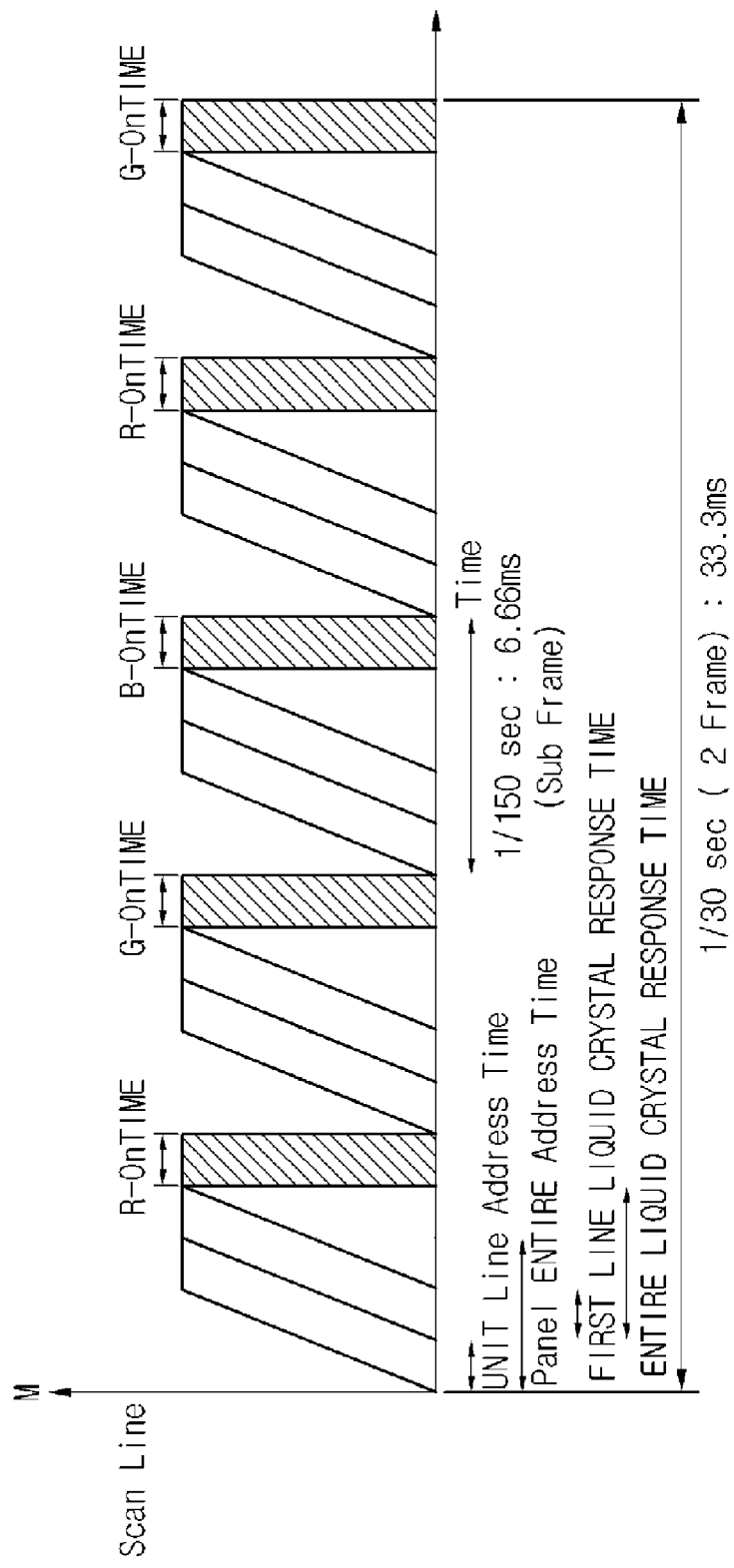
FIG. 3 is a view for describing a driving method of an LCD device according to an embodiment of the present invention.

To drive the LCD device using the field sequential driving method according to an embodiment of the present invention, liquid crystal arrangement and light emission of the backlight assembly should be modulated at a timing as shown in FIG. 3.

FIG. 3 illustrates lighting timings of the red LED, the green LED, the blue LED, the red LED, and the green LED of the backlight assembly 200 for a color image implementation, by considering a response time of the liquid crystal panel 100.

In the field sequential driving method according to an embodiment of the present invention, two frames are time-divided into five sub-frames. Then, the red LED, the green LED, the blue LED, the red LED, and green LED are sequentially turned ON for the respective sub-frames, with consideration of an arrangement of the liquid crystals. Also, timings between a data signal and a backlight assembly driving signal is controlled. A driving process using the field sequential driving method according to an embodiment of the present invention will now be described in detail.

In an embodiment of the present invention, the LCD device includes a gate driving IC and a data driving IC that are connected to a gate line and a data line formed in the liquid crystal panel 100, respectively to apply signals into a pixel. These gate driving IC and data driving IC are connected to a controller. Also, the controller is connected to a light controller controlling the backlight assembly 200.

When a command is input to the controller from an external host or the like, the controller applies a scan signal and a data signal to the liquid crystal panel 100 through the gate driving IC and the data driving IC, and simultaneously transmits a control signal to the backlight assembly 200 through the light controller. Thus, the red LED, the green LED, the blue LED, the red LED, and the green LED are sequentially operated in the light emitting unit 210 of the backlight assembly 200.

Here, a control signal generated by a timing controller to divide two frames into five sub-frames for the driving of the liquid crystal panel 100 is transmitted to the gate driving IC and the data driving IC connected to the liquid crystal panel 100.

For this purpose, the timing controller rearranges image data, which are supplied from a graphic controller such as a computer for respective red (R), green (G) and blue (B). The image data re-arranged by the timing controller is transferred to the data driving IC, and generates a data control signal and a gate control signal at a frequency required for the field sequential driving method.

The data driving IC sequentially samples red, green, blue, red and green data in response to the data control signal from the timing controller, latches the sampled data line by line, and converts the latched data into a gamma voltage.

The red, green, blue, red and green image data is sequentially supplied to the pixel electrode through the TFT 116 activated in synchronization with a gate pulse, and the liquid crystals are arranged.

Also, the timing controller controls the backlight assembly to sequentially drive the red LED, the green LED, the blue LED, the red LED and the green LED at the point of time when data is completely supplied to the pixel.

Here, the data driving IC outputs a frame signal of 60 Hz. As for the frame signal, one frame includes red, green and ½ blue sub-frames. Thus, two frames include five sub-frames of red, green, blue, red and green.

Thus, when the LCD device is driven at 60 Hz, one frame is displayed for 16.7 ms, and each sub-frame is displayed on a screen for 6.66 ms (1/150 s), which corresponds to $1/2.5$ of 16.7 ms.

Referring to FIG. 3, a data signal for liquid crystal arrangement is applied to the liquid crystal panel 100 in every sub frame of 6.66 ms, and then after a predetermined time intervals, the light emitting unit 210 of the backlight assembly 200 is operated. That is, by considering the arrangement time of the liquid crystals, the light emitting unit 210 is driven after the arrangement of each line is completed.

In the related art LCD device in which one frame is time-divided into three sub-frames, one sub-frame is displayed for 5.55 ms (1/180 s). Hence, the display time of the sub-frame according to an embodiment of the present invention, which is longer than that of the related art, may allow more efficient arrangement of liquid crystals and light emission of the LEDs of the light emitting unit 210.

A time interval of one frame of the LCD device driven at 60 Hz is 16.7 ms (1/60 s) by the related art driving method, and one sub-frame according to the field sequential driving method according to an embodiment of the present invention has a time interval of 6.66 ms (1/150 s).

Thus, according to an embodiment of the present invention, the liquid crystal arrangement and light emission of the light emitting unit 210 can be made within the time interval of 6.66 ms (1/150 s) of each sub-frame. Accordingly, in the case where the light emission time of the light emitting unit 210 is the same as that of the related art, the longer arrangement time of the liquid crystal can be secured by the extended time interval, 1.11 ms (obtained by subtracting 5.55 ms from 6.66 ms) as compared to the related art. Also, in the case where the liquid crystal arrangement time is the same as that of the related art, the light emission of the light emitting unit 210 can be made for a longer period of time by the extended time interval, 1.11 ms (obtained by subtracting 5.55 ms from 6.66 ms).

Light emitted by the field sequential driving method according to an embodiment of the present invention sequentially passes through the first polarizer 112 and the first substrate 110 via the light guide plate 220, and then passes through the liquid crystal layer 130. Red, green and blue signals are sequentially applied to the pixel electrode 114 from the data driving IC, and the red LED, the green LED, and the blue LED of the backlight assembly 200 sequentially emit light to the liquid crystal panel 100.

A color is implemented for each pixel by the temporal combination of red light, green light and blue light emitted from the backlight assembly 200 to the liquid crystal panel in such a manner. Here, the human eye recognizes the 16.7 ms as a whole, so that a color obtained by a combination of R, G and B can be recognized.

According to the field sequential driving method according to an embodiment of the present invention, two frames are formed using five sub-frames in which respective red, green, blue, red and green light are emitted respectively, so that the incidence times of the red and green light are extended. Accordingly, a high resolution, high quality image with an improved brightness can be implemented.

The LCD device according to an embodiment of the present invention may obtain a color image without using a color filter since the LCD device includes light sources respectively emitting red light, green light and blue light. Accordingly, according to an embodiment of the present invention, since an image is displayed using a liquid crystal panel without a color filter, light absorption caused by the color filter does not occur, and thus an image with a high brightness can be obtained.

In the LCD device according to an embodiment of the present invention, a unit pixel of a single structure without R, G and B sub-pixels and a black matrix can be formed. That is, the unit pixel is formed as one whole pixel according to an embodiment of the present invention, unlike the related art liquid crystal panel having a color filter including pixels each divided into three sub-pixels (R, G and B sub-pixels).

Accordingly, one driving device for each unit pixel may be formed according to an embodiment of the present invention, unlike the related art liquid crystal panel including unit pixels each divided into R, G and B sub-pixels and three driving devices for application of a data signal to the respective sub-pixels. Thus, according to an embodiment of the present invention, a manufacturing cost of the driving device can be saved, an aperture ratio can be improved since the unit pixel is not divided into the R, G and B sub-pixels, and a high resolution image can be obtained.

Even though the light emitting unit provided in the backlight assembly includes an LED in the above-mentioned description, the light emitting unit may include a cold cathode fluorescent lamp (CCFL), or an external electrode fluorescent lamp (EEFL).

Also, in the description above, two frames are time-divided into five sub-frames having the same time interval.

However, according to the LCD device and the driving method thereof according to an embodiment of the present invention, the two frames may be time-divided into five sub-frames having different time intervals. That is, when two frames are time-divided into five sub-frames, and red, green, blue, red, and green light is emitted, the light emission period of each color may be changed if necessary.

Also, according to the LCD device and the driving method thereof according to an embodiment of the present invention, when images of the first frame and the second frame constituting the two frames are displayed, the images of the first frame and the second frame share one blue light. Hence, emission order of red light and green light for the respective sub-frames may be changed.

Industrial Applicability

In an LCD device and a driving method according to an embodiment of the present invention, two frames are formed using five sub-frames respectively emitting red, green, blue, red and green light. Thus, the display time for each sub-frame is extended, and thus the incidence times of the red light and the green light are increased, so that a high resolution, high quality image with an improved brightness can be obtained.

In the LCD device and the driving method thereof according to an embodiment of the present invention, since light sources respectively emitting red light, green light and blue light are provided, a high quality color image can be obtained without using a color filter. Hence, light absorption caused by the color filter does not occur so that an image with a high brightness can be obtained.

In the LCD device and the driving method thereof according to an embodiment of the present invention, two frames are formed using five sub-frames emitting red, green, blue, red, green light. Thus, the display time for each sub-frame is extended, and thus the arrangement time of liquid crystals is increased, so that a technology for a high response speed of the liquid crystals is not necessary. Consequently, a manufacturing cost can be saved.

In the LCD device and the driving method according to an embodiment of the present invention, since a unit pixel is not divided into R, G and B sub-pixels, an aperture ratio can be improved, and a high resolution image can be obtained.

In the LCD device and the driving method according to an embodiment of the present invention, the LCD device is driven, not in units of the related art R, G and B sub-pixels, but in units of unit pixels corresponding to a combination of the related art R, G and B sub-pixels, thereby allowing one driving device per unit pixel. Consequently, a manufacturing cost can be saved.

The invention claimed is:

1. A liquid crystal display device comprising:
   a liquid crystal panel: and
   a backlight assembly providing light to the liquid crystal panel repetitively in order of red light, green light, blue light, red light, and green light,
   wherein the liquid crystal panel and the backlight assembly display an image by time-dividing two frames into five sub-frames,
   wherein when the two frames are time-divided into the five sub-frames, the five sub-frames have the same time interval,
   wherein the two frames comprise a red sub-frame, a green sub-frame, and a ½ blue sub-frame, respectively, and
   wherein images of a first frame and a second frame of the two frames share one blue light when images are displayed in the two frames.

2. The liquid crystal display device according to claim 1, wherein the backlight assembly includes red, green and blue light emitting diodes.

3. The liquid crystal display device according to claim 1, wherein the backlight assembly is formed by direct-type under the liquid crystal panel.

4. The liquid crystal display device according to claim 1, wherein the liquid crystal panel does not include a color filter, and
   the backlight assembly includes a light guide plate formed under the liquid crystal panel, and a light emitting unit formed at an edge of the light guide plate.

5. The liquid crystal display device according to claim 1, wherein a response time of the liquid crystal panel is less than 6.66 ms.

6. The liquid crystal display device according to claim 1, wherein when the images of the first frame and the second frame of the two frames share the one blue light, a first ½ of the blue sub-frame occurs at the end of the first frame and a second ½ of the blue sub-frame occurs at the beginning of the second frame.

7. The liquid crystal display device according to claim 1, wherein in each of the two frames, the green sub-frame has the same time interval as the red sub-frame, and the blue sub-frame has ½ the time interval as the green sub-frame.

8. A driving method of a liquid crystal display device including a liquid crystal panel, and a backlight assembly providing light to the liquid crystal panel repetitively in order of red, green, blue, red and green light, the method comprising:

displaying, at the liquid crystal panel and the backlight assembly, an image by time-dividing two frames into five sub-frames; and displaying an image on the liquid crystal panel by repetitive emission of red light, green light, blue light, red light, and green light that are sequentially emitted from the backlight assembly for the respective sub-frames, wherein when the two frames are time-divided into the five sub-frames, the five sub-frames have the same tine interval, wherein the two frames comprise a red sub-frame, a green sub-frame, and a ½ blue sub-frame, respectively, and wherein images of a first frame and a second frame of the two frames share one blue light when images are displayed in the two frames.

9. The driving method according to claim 8, wherein the backlight assembly includes red, green and blue light emitting diodes.

10. The driving method according to claim 8, wherein the backlight assembly is formed by direct-type under the liquid crystal panel.

11. The driving method according to claim 8, wherein when the images of the first frame and the second frame of the two frames share the one blue light, a first ½ of the blue sub-frame occurs at the end of the first frame and a second ½ of the blue sub-frame occurs at the beginning of the second frame.

12. The driving method according to claim 8, wherein in each of the two frames, the green sub-frame has the same time interval as the red sub-frame, and the blue sub-frame has ½ the time interval as the green sub-frame.

13. A driving method of a liquid crystal display device including a liquid crystal panel, and a backlight assembly providing light to the liquid crystal panel by a field sequential driving light to the liquid crystal panel by a field sequential driving method, the method comprising:

displaying an image, at the liquid crystal panel and the backlight assembly, by time-dividing two frames into five sub-frames, wherein images of a first frame and a second frame of the two frames share one blue light when images are displayed in the two frames, wherein when the two frames are time-divided into the five sub-frames, the sub-frames have the same time interval, and wherein the two frames comprise a red sub-frame, a green sub-frame, and a ½ blue sub-frame, respectively.

14. The driving method according to claim 13, wherein when the two frames are time-divided into the five sub-frames, red light, green light, blue light, red light, and green light are sequentially and repetitively provided to the respective sub-frames.

15. The driving method according to claim 13, wherein when the two frames are time-divided into the five sub-frames, green light, red light, blue light, green light, and red light are sequentially and repetitively provided to the respective sub-frames.

16. The driving method according to claim 13, wherein when the images of the first frame and the second frame of the two frames share the one blue light, a first ½ of the blue sub-frame occurs at the end of the first frame and a second ½ of the blue sub-frame occurs at the beginning of the second frame.

17. The driving method according to claim 13, wherein in each of the two frames, the green sub-frame has the same time interval as the red sub-frame, and the blue sub-frame has ½ the time interval as the green sub-frame.

* * * * *